United States Patent
Nakamura et al.

(10) Patent No.: US 7,016,442 B2
(45) Date of Patent: Mar. 21, 2006

(54) DEMODULATION METHOD

(75) Inventors: Manabu Nakamura, Tokyo (JP);
Shinichi Miyashita, Fujiyosida (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 758 days.

(21) Appl. No.: 09/955,113

(22) Filed: Sep. 19, 2001

(65) Prior Publication Data
US 2002/0037063 A1 Mar. 28, 2002

(30) Foreign Application Priority Data
Sep. 22, 2000 (JP) ............................. 2000-289069

(51) Int. Cl.
*H04L 7/00* (2006.01)
(52) U.S. Cl. ...................................... 375/354; 375/355
(58) Field of Classification Search ................ 375/354, 375/359, 360, 364, 365, 366, 367, 368
See application file for complete search history.

(56) References Cited

U.S. PATENT DOCUMENTS

| | | | | | |
|---|---|---|---|---|---|
| 5,164,965 A | * | 11/1992 | Karaali | ........................ | 375/355 |
| 5,343,502 A | * | 8/1994 | Sato | ............................ | 375/354 |
| 5,526,381 A | * | 6/1996 | Boccuzzi | ..................... | 375/331 |
| 5,974,040 A | * | 10/1999 | Kimura | ....................... | 370/337 |
| 6,069,883 A | * | 5/2000 | Ejzak et al. | ................. | 370/335 |
| 6,115,411 A | * | 9/2000 | van Driest | ................... | 375/130 |

\* cited by examiner

*Primary Examiner*—Young T. Tse
*Assistant Examiner*—Sam K. Ahn
(74) *Attorney, Agent, or Firm*—Wenderoth, Lind & Ponack, L.L.P.

(57) ABSTRACT

A demodulation method for establishing clock synchronization within a short period of time from a received signal modulated by π/4-shift QPSK modulation that contains a synchronization establishment signal whose change in amplitude periodically alternates between positive and negative, and for demodulating the received signal. The method includes establishing synchronization from the received signal based on the timing of changes in the positive/negative polarity of the change in amplitude of the synchronization establishment signal contained in the received signal, and demodulating the received signal.

1 Claim, 13 Drawing Sheets

(a) Case in which preamble is lengthened

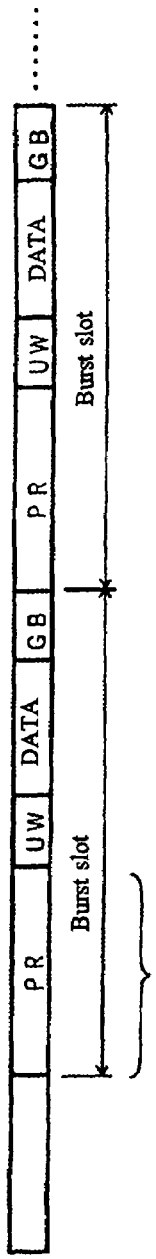

Preamble period is made 100 symbols or longer

In this case, the length of the preamble becomes a large fraction of the entire length, so the data transmission rate drops.

(b) Case in which first burst is discarded

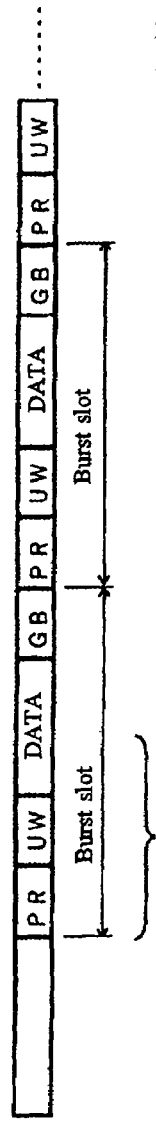

If the preamble is not made long, there is a risk that data cannot be demodulated with only a length of roughly 100 symbols. In the above diagram, there is a risk that the portion up to UW and DATA cannot be received correctly at the time of receipt of the first burst. In addition, it is necessary to hold the timing of synchronization at the time of receipt of the first burst so that it can be used in the second and subsequent bursts.

P R : Preamble pattern
U W : Unique word (identification pattern)
DATA : Body of communications data
G B : Guard bits (buffer timing between slots)

Fig. 13
Prior Art

DEMODULATION METHOD

BACKGROUND OF THE INVENTION

1. Field of the Invention

The present invention relates to a demodulation method wherein clock synchronization is established from a burst signal which is modulated by means of the π/4-shift QPSK (Quadrature Phase Shift Keying) modulation scheme, for example, to a synchronization establishment apparatus, modem or base station, and particularly to a technique for establishing synchronization in a short period of time.

2. Description of the Prior Art

In a wireless communications system wherein wireless communication is performed in a burst manner, a wireless transmitter wirelessly transmits a burst signal which is modulated by a modulator, and at the time that a wireless receiver begins the receipt of the burst signal, the establishment of clock synchronization from the burst signal is performed by a demodulator. In addition, in such a wireless communications system, various modulation schemes and demodulation schemes are used, for example, π/4-shift QPSK.

FIG. 11 shows one example of the structure of a burst signal.

As shown in FIG. 11, the various burst slots contained within a burst signal consist of, in order from the beginning, a preamble pattern (PR) which is a pattern for establishing synchronization, a unique word (UW) which is an identification pattern for determining the base position of the burst, DATA which is the body of communications data, and guard bits (GB) which prevent the overlapping of bursts by providing buffer timing between slots.

When communications is performed in bursts, the receiver refers to the preamble pattern at the start of receiving the respective bursts, and establishes the synchronization of its own clock. When a burst signal having a frame format as shown in FIG. 11 above is used, it is preferable to establish synchronization prior to the unique word, for example.

In addition, FIG. 12 shows one example of a demodulation circuit which is implemented in a wireless receiver that establishes clock synchronization as described above. In this demodulation circuit, clock synchronization is established by means of feedback control as a typical method. In addition, the example shown in FIG. 12 illustrates the case in which demodulation is performed by the delay detection system wherein π/4-shift QPSK is used as the modulation scheme.

Specifically, in the demodulation circuit illustrated in FIG. 12, a (π/4-shift QPSK) burst signal received by a wireless receiver is converted from an analog signal to a digital signal by means of an A/D converter 61, demodulated into an I component (in-phase component) and a Q component (quadrature component) by a demodulator 62, and then the I component and the Q component are filtered by filter 63 and filter 64, respectively.

The I component and the Q component which are output from the two filters 63 and 64 are input to a (delayed) detector 65 and are also input to a clock phase detection circuit 66. Moreover, in the detector 65, the input I component and the Q component are demodulated by delayed detection so as to generate demodulated data. In addition, a parallel/serial converter 68 converts the demodulated data of the I component and the Q component which are output from the detector 65 from parallel data to serial data. In addition, the clock phase detection circuit 66 detects the phase of the clock from the inputted I component and Q component, and a clock regeneration circuit 67 generates a synchronization clock based on the results of this detection, whereby feedback control of the aforementioned A/D converter 61, filters 63 and 64, and detector 65 is performed.

As an example of the prior art of π/4-shift QPSK synchronization detection circuits, we shall describe the "Digital Demodulation Circuit, Maximum Value Detection Circuit and Receiver" recited in the publication of unexamined Japanese patent application JP-A-9-266499.

This example of prior art relates to a Personal Handy phone System (PHS) or other mobile communications system, with an object of providing a digital demodulator having a synchronization detection circuit that enables a high-speed operation and that can be implemented in a more compact manner or in ICs, and relates to technology for eliminating frequency errors and phase errors between the transmitter and receiver.

Specifically, in this prior-art example, a preamble pattern consisting of a repeated pattern of "1001" is used, and by detecting the frequency difference during the period of this preamble pattern and by forming a frequency difference compensation signal based on a phase change pattern of instantaneous phase signals during this preamble pattern, it is intended to enlarge the permissible range of phase noise over which the phase difference between the carrier signals can be correctly detected.

In addition, in this prior-art example, a carrier generator compares the phase of the carrier signal it generates itself against the phase of the carrier signal of the received signal so as to detect the phase error, and thus the establishment of synchronization is performed by correcting this phase error. In addition, in this prior-art example, the phase of the π/4-shift QPSK received signal is shifted backwards by π/4 and processing is performed in a manner corresponding to QPSK. In this case, the preamble pattern becomes a waveform wherein a phase change of π is repeated every symbol, so it can be treated as a Binary Phase Shift Keying (BPSK) signal, and thus it is resistant to erroneous detection due to phase noise and high-precision phase detection is possible.

However, in the prior-art demodulation circuit shown in FIG. 12 above, in order to establish clock synchronization based on the preamble pattern, with the performance of a typical receiver, there is a difficulty in that a reception period is required that is as long as approximately 100 symbols from the start of reception of the burst signal.

With reference to FIG. 13, we shall describe in detail the problems that occur due to the aforementioned difficulty.

FIG. 13(a) shows an example of the structure of a burst signal in the case wherein, in order to handle the long period until the establishment of the clock of approximately 100 symbols, a preamble pattern having a length (period) which is equivalent to 100 symbols or longer is provided. However, in this case, since the length (period) of the preamble pattern becomes a large fraction of the length (period) of the entire burst slot, there is a problem in that this preamble pattern period becomes wasted time in data communications, thus decreasing the data communications (transmission) rate.

In addition, FIG. 13(b) shows an example of the structure of a burst signal in the case wherein the length (period) of the preamble pattern is not as long as that shown in FIG. 13(a). In this case, there is a possibility that the received signal cannot be demodulated correctly during the period of roughly 100 symbols from the start of reception, so there is a possibility that at the time of reception of the first burst, the unique word and data periods also cannot be demodulated normally. For this reason, there is the problem in that it will be assumed that the data received during the receipt of the first burst cannot be received normally and thus this data received in the first burst will be discarded. In addition, there is also the problem in that the timing of synchronization which is established at the time of receipt of the first burst must be stored for use at the lime of receipt of the second and subsequent bursts.

The present invention was devised in order to solve the aforementioned problems with the prior art. Accordingly, an object of the present invention is to provide a demodulation method wherein, at the time of the establishment of clock synchronization based on a burst pattern contained at the front of a (π/4-shift QPSK) burst signal, synchronization can be established in a short period of time, along with a synchronization establishment apparatus, modem or base station.

SUMMARY OF THE INVENTION

To attain the above-described object, the demodulation method according to the present invention comprises establishing synchronization from a received signal that contains a synchronization establishment signal wherein the change in amplitude (of the synchronization establishment signal) periodically alternates between positive and negative, and demodulating the received signal. More specifically, the demodulation method comprises establishing synchronization from the received signal based on the timing of changes in the positive/negative polarity of the change in amplitude of the synchronization establishment signal that is contained in the received signal, and demodulating said received signal.

Accordingly, by establishing the synchronization (e.g., clock synchronization) based on the timing at which the amplitude difference of the synchronization establishment signal (e.g., a preamble pattern) periodically alternates between positive and negative, it is possible to establish synchronization in a short period of time. Thereby, it is possible to make the length (period) of the preamble pattern relatively short and increase the data transmission rate. In addition, even when a preamble pattern of a short length (period) is used, synchronization is established within the period of the preamble pattern, so it is possible for the received data in the first burst reception to be received correctly and reliably.

In addition, in the demodulation method according to the present invention, at the time of performing demodulation as described above, synchronization is established for each received signal from a plurality of received signals, and each of the received signals is demodulated.

As described above, in accordance with the present invention, synchronization can be established in a short period of time, so even in the above case in which a plurality of received signals containing synchronization establishment signals are received at nearly the same timing, it is possible to establish synchronization with each of the plurality of received signals in a short period of time, and as a result, it is possible to establish synchronization in a short period of time with the entire plurality of received signals.

In addition, in accordance with the present invention, when the same technical idea as that of the aforementioned demodulation method according to the present invention is applied to a synchronization establishment apparatus, modem and base station, the establishment of synchronization from received signals was achieved in a short period of time in the same manner as above.

To wit, in a synchronization establishment apparatus according to the present invention, at the time of establishing synchronization from a received signal containing a synchronization establishment signal wherein the change in amplitude (of the synchronization establishment signal) periodically alternates between positive and negative, the positive/negative change timing detection means detects the timing of changes in the positive/negative polarity of the change in amplitude of the synchronization establishment signal that is contained in the received signal, and synchronization is established from the received signal based on the timing which is detected by the synchronization establishment means.

In addition, the modem according to the present invention, in the following manner, modulates transmitted signals, establishes synchronization from a received signal that contains a synchronization establishment signal wherein the change in amplitude (of the synchronization establishment signal) periodically alternates between positive and negative, and demodulates the received signal. To wit, the modulating means modulates transmitted signals, the positive/negative change timing detection means detects the timing of changes in the positive/negative polarity of the change in amplitude of the synchronization establishment signal that is contained in the received signal, the synchronization establishment means establishes synchronization from the received signal based on the timing which is detected by the synchronization establishment means, and the demodulation means demodulates the received signal according to the synchronization timing which is established by the demodulation means.

In addition, the base station according to the present invention is implemented in a traffic information system wherein base stations and mobile stations communicate wirelessly. Moreover, the base station according to the present invention, in the following manner, modulates signals and wirelessly transmits the same to the mobile stations, wirelessly receives from the mobile stations a signal that contains a synchronization establishment signal wherein the change in amplitude (of the synchronization establishment signal) periodically alternates between positive and negative, establishes synchronization from the said received signal, and demodulates the received signal. To wit, in the base station, an antenna transmits and receives wireless signals, a modulating means modulates signals, a transmission means wirelessly transmits modulated signals to the mobile stations via the antenna, while a receiving means receives, via the antenna, signals that are transmitted wirelessly from the mobile stations, a positive/negative change timing detection means detects the timing of changes in the positive/negative polarity of the change in amplitude of the synchronization establishment signal that is contained in the received signal, a synchronization establishment means establishes synchronization from the received signal based on the detected timing, and a demodulation means demodulates the received signal according to the established synchronization timing. In addition, a control means communicates the signals which are exchanged with the mobile station to an external apparatus (e.g., other base stations or a main control facility).

The above and other objects, features and advantages of the present invention will become more apparent from the description given hereinbelow with reference to the accompanying drawings.

BRIEF EXPLANATION OF THE DRAWINGS

FIG. 13 is a diagram used to explain the problem in the prior art.

DETAILED DESCRIPTION OF THE PREFERRED EMBODIMENTS

We shall now describe the synchronization establishment circuit (synchronization establishment apparatus) according to Example 1 of the present invention with reference to the drawings. Note that in this Example, we shall also describe the demodulation method according to the present invention.

Figure 1:
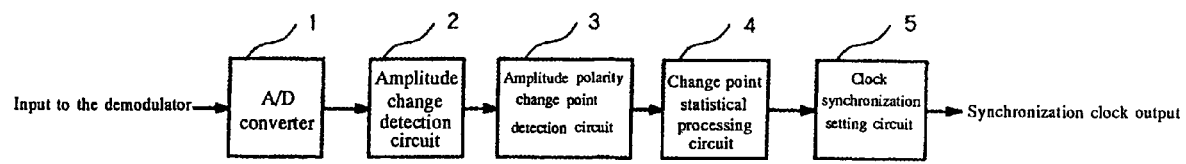
FIG. 1 is a schematic diagram of an example of the constitution of a synchronization establishment circuit according to Example 1 of the present invention.
Figure 11:
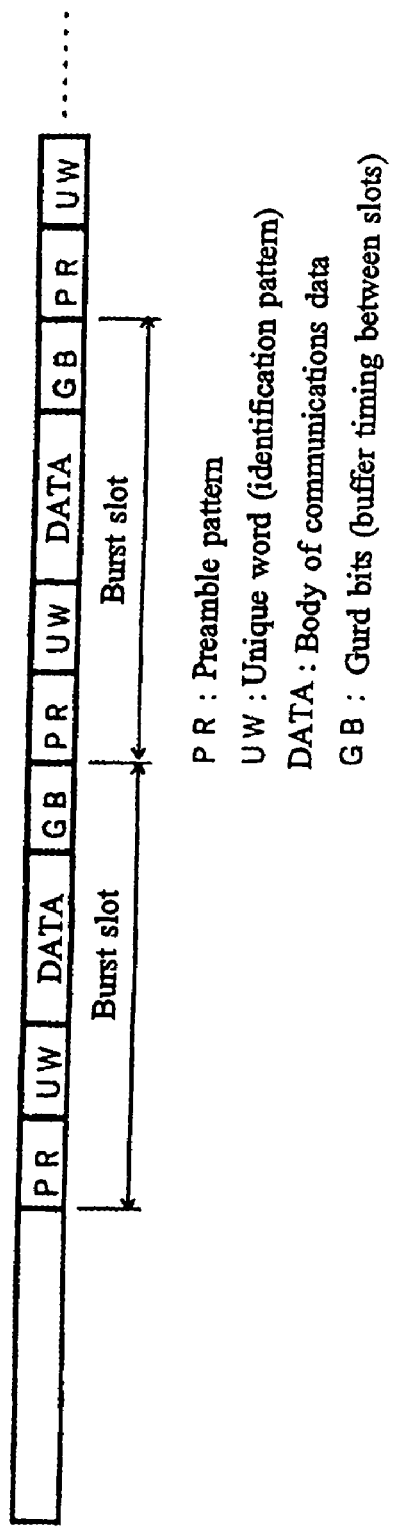
FIG. 11 is a diagram showing an example of the constitution of a burst signal.
Figure 12:
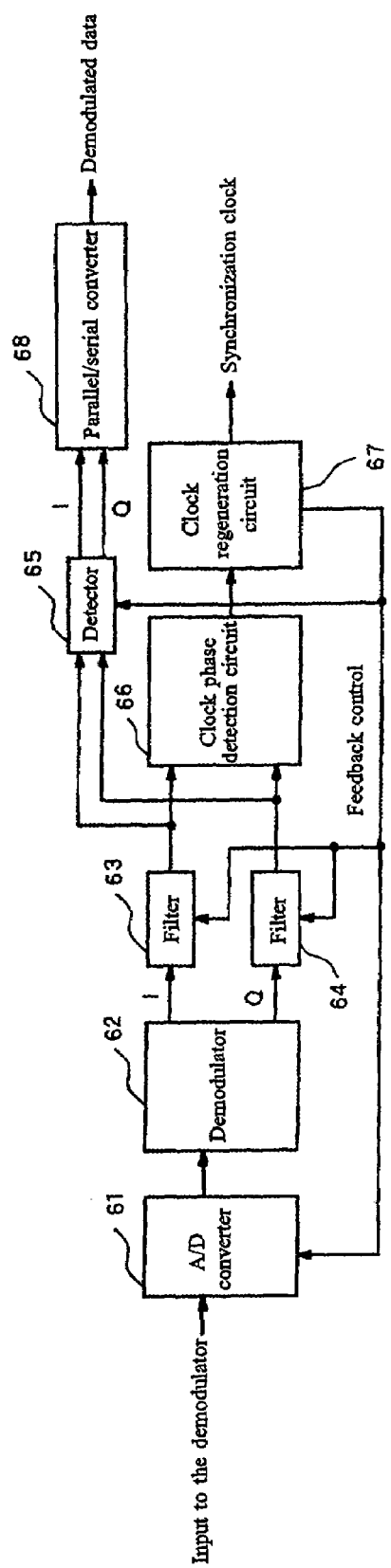
FIG. 12 is a diagram showing an example of the constitution of a demodulation circuit according to a prior-art example.

FIG. 1 is a schematic diagram of an example of the constitution of a synchronization establishment circuit according to this Example. This synchronization establishment circuit is equipped with a wireless receiver that receives burst signals having the same structure as that shown in FIG. 11 above, and establishes the clock synchronization based on the preamble pattern that is contained in the burst signals.

In addition, this Example illustrates the case wherein the wireless transmitter and the wireless receiver perform the wireless communication of signals by using the $\pi/4$-shift QPSK modulation scheme. In addition, this Example illustrates the case in which the preamble pattern that is contained at the start of the burst signal which is wirelessly transmitted from the wireless transmitter is a pattern wherein "1001" is repeatedly generated to form the pattern "10011001100 . . . "

Here, the pattern with "1001" repeated in $\pi/4$-shift QPSK becomes a pattern wherein the change in amplitude periodically alternates between positive and negative, and we shall now describe this in detail.

Figure 2:
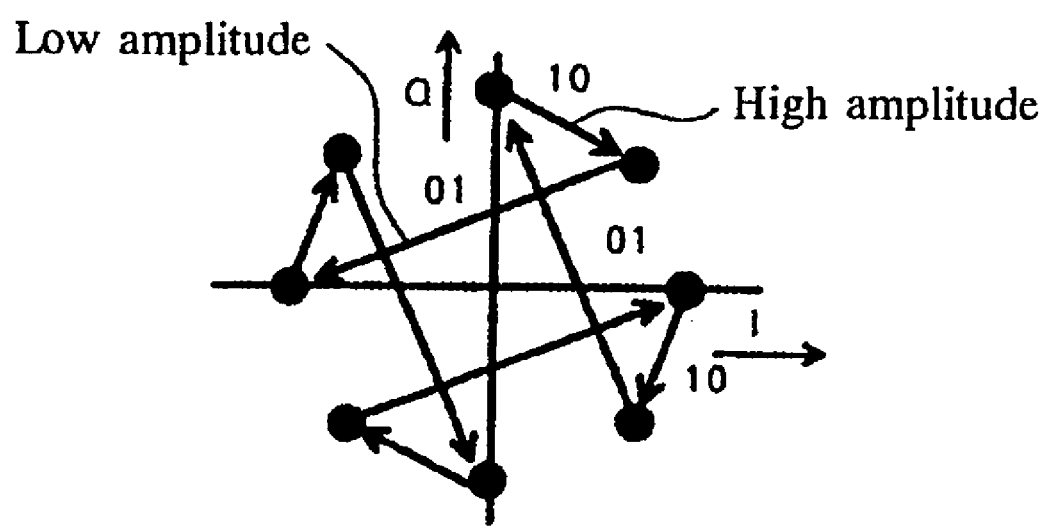
FIG. 2 is a diagram of one example of the constellation of the preamble pattern.

FIG. 2 shows an example of the transition in the phase and amplitude (constellation) of the modulated wave in a modulated wave which is generated by modulating the aforementioned preamble pattern by means of the $\pi/4$-shift QPSK modulation scheme. In FIG. 2, the I component is shown on the horizontal axis while the Q component is shown on the vertical axis. Note that this modulated wave is obtained by subjecting the aforementioned preamble pattern to Gray encoding, summation logic-value conversion, and $\pi/4$-shift QPSK modulation.

As shown in FIG. 2, in $\pi/4$-shift QPSK, the bit pattern (symbol) "10" may correspond to a phase change of $-(\pi/4)$ (a phase change in which the change in phase is negative), for example, and the bit pattern (symbol) "01" may correspond to a phase change of $+(3\pi/4)$ (a phase change in which the change in phase is positive), for example In addition, with a bit pattern (symbol) of "10," the value of the amplitude is high, but with a bit pattern (symbol) of "01," the value of the amplitude is low. To wit, in a pattern wherein "10" and "01" are repeated (a pattern wherein "1001" is repeated), the change in amplitude periodically alternates between positive and negative. In addition, with this pattern, when eight transitions in the phase of the modulated wave occur, the phase in question has undergone a transition of one complete revolution ($2\pi$), and has returned to the original phase position.

Note that in this Example, the preamble pattern consists of a 1-byte ramp (R) and a 4-byte preamble, giving a total of 5 bytes of data (20 symbols worth of data), so "1001" is repeated 10 times.

In addition, while the Examples in this Specification illustrate cases wherein a pattern in which "1001" is repeated is used as the preamble pattern, it is also possible, according to the present invention, to use any other pattern as the preamble pattern so as long as the change in amplitude periodically alternates between positive and negative.

Figure 3:
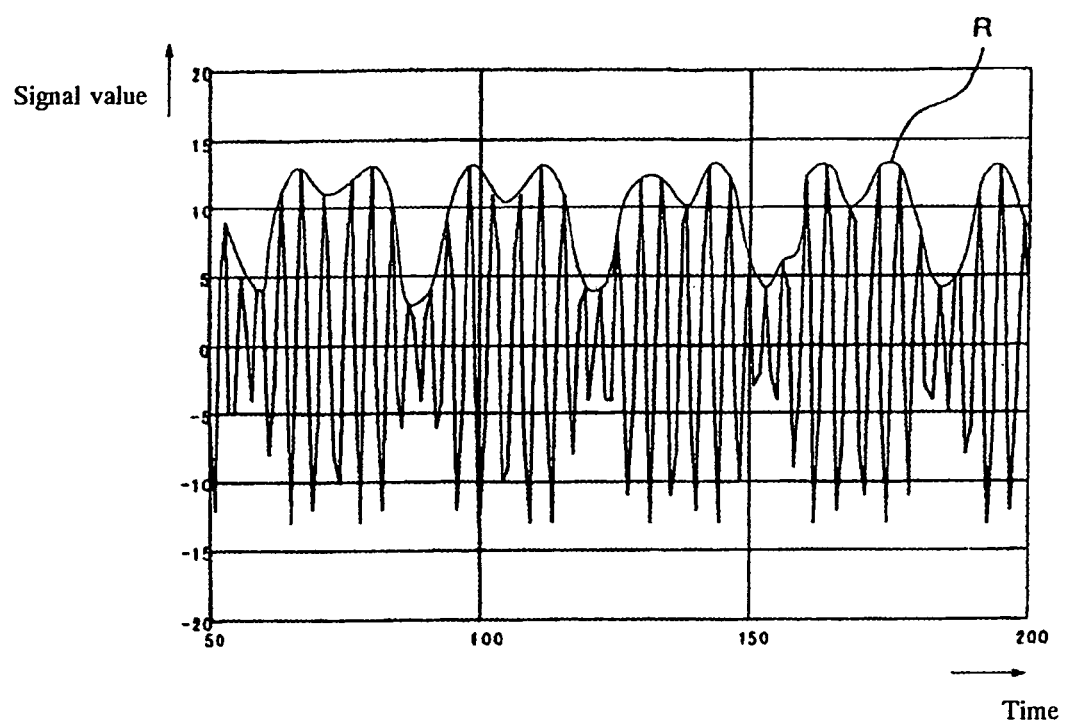
FIG. 3 is a diagram of one example of an amplitude change waveform in the preamble pattern.

In addition, FIG. 3 illustrates one example of a waveform wherein the modulated wave of the preamble pattern shown in FIG. 2 above is sampled (digitized) by an A/D converter. In FIG. 3, time (e.g., the value in the case where the sample number is used as a unit) is shown on the horizontal axis while the signal value of this waveform is on the vertical axis. In addition, an envelope R of this waveform is also shown in FIG. 3 As shown in FIG. 3 above, in $\pi/4$-shift QPSK, the "1001100001 . . . " preamble pattern gives rise to a periodic change in amplitude, and the change in amplitude also periodically alternates between positive and negative In this Example, as will be described later, the detection of such a change in amplitude (direction) is used to detect the precise point of change between symbols (here, the symbol "10" and the symbol "01") and therefore establish clock synchronization.

In reference to FIG. 1 above, we shall present a schematic example of the operation of the synchronization establishment circuit of this Example.

As shown in FIG. 1, the synchronization establishment circuit of this Example consists of an A/D converter 1, an amplitude change detection circuit 2, an amplitude polarity change point detection circuit 3, a change point statistical processing circuit 4 and a clock synchronization setting circuit 5.

The A/D converter I has the functions of accepting the input of a burst signal (here, the preamble pattern signal that is contained in the burst signal) which is received as an input to the demodulator, converting this signal from an analog signal to a digital signal, and providing the output of the converted digital signal (digital value) to the amplitude change detection circuit 2.

The amplitude change detection circuit 2 has the functions of detecting the change in amplitude of the digital signal based on the value of the digital signal that is input from the A/D converter 1, and providing the results of this detection as output to the amplitude polarity change point detection circuit 3.

The amplitude polarity change point detection circuit 3 has the functions of determining the polarity of the change in amplitude (whether this change is positive or negative) which is detected by the amplitude change detection circuit 2, detecting the point in time (timing) when this polarity changes, and providing the results of this detection as output to the change point statistical processing circuit 4. Note that such a polarity change point may be acquired by detecting the timing at which the polarity of the amplitude change which is detected by the amplitude change detection circuit 2 inverts (changes from positive to negative, or changes from negative to positive), and namely, this timing can be used as the polarity change point.

The change point statistical processing circuit 4 has the functions of counting the number of polarity change points which are detected by the amplitude polarity change point detection circuit 3 within the measurable range of the preamble pattern, for example, determining the timing period (time interval between adjacent polarity change points) that most closely fits the detected plurality of polarity change points, and providing the output of the results of this determination to the clock synchronization setting circuit 5

Note that by assuming no errors in wireless communications, it would be possible to detect one timing period for every symbol, but considering the errors in actual wireless communications, it is preferable to sample a large number of timing periods (preferably as many as possible). In addition, the number of samplings of the timing period may be determined based on the length (period) of the preamble pattern, for example. The aforementioned change point statistical processing circuit 4 tabulates the sampled timing periods, and, for example, may take an average of a plurality of detected results and report the resulting timing period to the clock synchronization setting circuit 5, or, may determine the most frequently detected timing period based on a distribution of the tabulated results and report this to the clock synchronization setting circuit 5.

The clock synchronization setting circuit 5 has the functions of using the timing period which is reported from the change point statistical processing circuit 4 to establish the clock synchronization (bit synchronization), and providing the output of a synchronization clock generated which is based thereupon to the various processors (that operate on this synchronization clock). Note that the establishment of clock synchronization is achieved by matching the period of the pulse signals that constitute this clock to the aforementioned timing period.

Next, we shall present an example of a more specific constitution of the synchronization establishment circuit of this Example, and an example of its operation.

Figure 4:
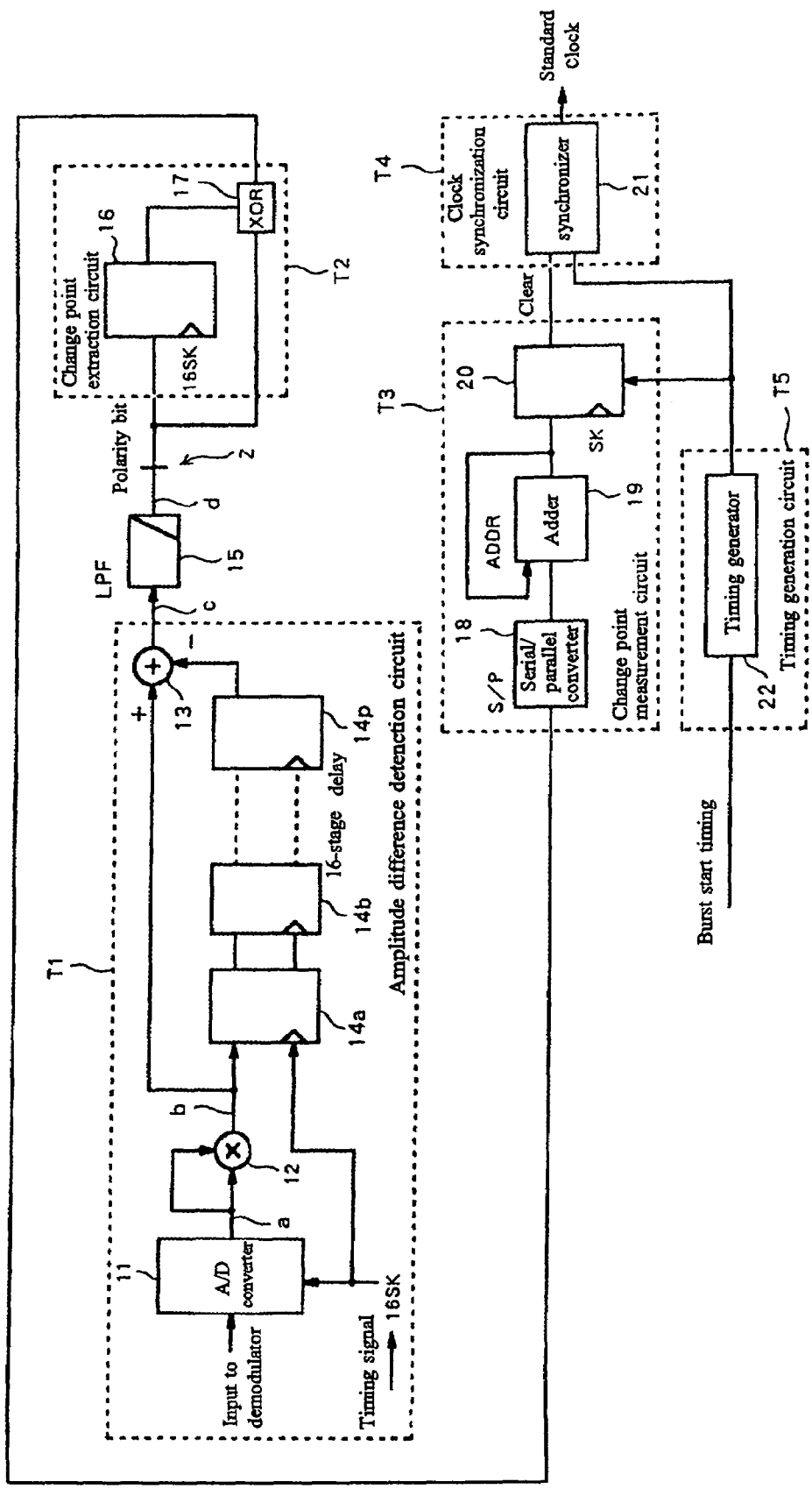
FIG. 4 is a diagram of the specific constitution of the synchronization establishment circuit according to Example 1 of the present invention.

FIG. 4 shows a more specific constitution of the synchronization establishment circuit of this Example.

The synchronization establishment circuit shown in FIG. 4 consists of an amplitude difference detection circuit T1, a low pass filter 15, a polarity bit converter Z, a change point extraction circuit T2, a change point measurement circuit T3, a clock synchronization circuit T4 and a timing generation circuit T5.

Note that in the circuit of this Example, analog data is sampled at a clock running at 16 times the baud rate.

The amplitude difference detection circuit T1 consists of an A/D converter 11, a multiplier 12, an adder 13 and sixteen (sixteen stages of) registers 14a through 14p.

Based on a timing signal that is output from a timing generator 22 which is to be described later, for example, the A/D converter 11 accepts an input of a burst signal (here, the preamble pattern signal that is contained in the burst signal) which is received as the input to the demodulator, converts this signal from an analog signal to a digital signal (8-bit in this Example), and provides the output of the converted digital signal (digital value) via two paths to the multiplier 12. Here, as one example of the waveform when the preamble pattern is sampled (digitized) by the A/D converter 11 and output (the value at point "a" shown in FIG. 4), the waveform shown in FIG. 3 as described above is obtained.

The multiplier 12 takes the digital signal output from the AID converter 11 that is input via two paths, multiplies these two digital signals (digital values) and outputs the result of this multiplication the adder 13 and the first-stage register 14a. Here, the multiplication result that is output from the multiplier 12 becomes the square of the value of the digital signal (digital value) that is output from the A/D converter 11.

Figure 5:
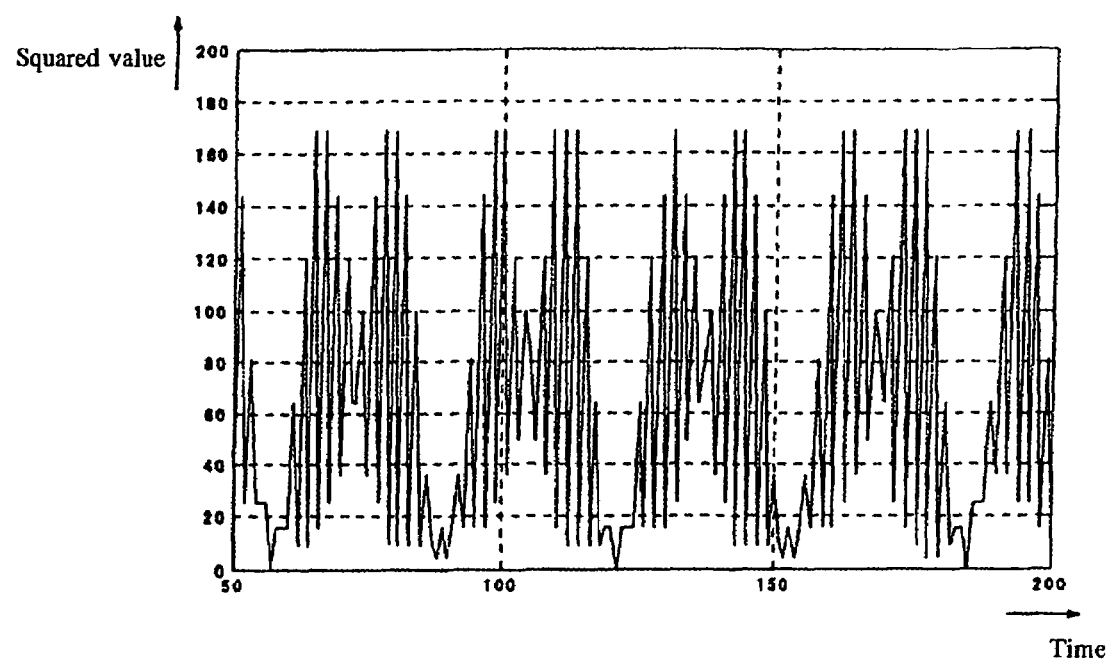
FIG. 5 is a diagram showing one example of the waveform of a squared amplitude change waveform.

In addition, FIG. 5 illustrates one example of the waveform of the signal that is output from the multiplier 12 (the value at point "b" shown in FIG. 4), namely the waveform of the square of the output waveform from the A/D converter 11 (the waveform shown in FIG. 3 above). In FIG. 5, the time is shown on the horizontal axis while the squared value is on the vertical axis. Referring to the waveform in FIG. 5 (the squared value), one can see the temporal change in the amplitude of the received signal. To wit, a large squared value is equivalent to a high amplitude value, and a small squared value is equivalent to a low amplitude value.

Based on a timing signal that is output from a timing generator 22 to be described later, for example, the first-stage register 14a outputs the squared value which is input from the multiplier 12 to the next-stage register 14b after a delay of one clock cycle (of the aforementioned clock running at 16 times the baud rate).

Similarly, based on a timing signal that is output from a timing generator 22 to be described later, each of the second-through fifteenth-stage resisters 14b–14o outputs the squared value which is input from the previous-stage register to the next-stage register after a delay of one clock cycle.

Based on a timing signal that is output from a timing generator 22 to be described later, for example, the sixteenth-stage (last-stage) register 14p inputs the squared value which is input from the previous-stage register 14o and outputs the squared value to adder 13 after a delay of one clock cycle.

By each of these sixteen registers 14a–14p delaying the squared value by one clock cycle, the squared value is delayed by a total of 16 clock cycles (1 symbol) and output to the adder 13.

The adder 13 (in this Example, a device that adds with positive and negative inverted) accepts an input of the squared-value data (taken to be X1 here) which is input from the multiplier 12 and also accepts an input of this squared-value data which is shifted by sixteen clock cycles (taken to be X2 here) from register 14p and outputs the difference between these two pieces of data (in this example, X1−X2) to the low pass filter 15.

Figure 6:
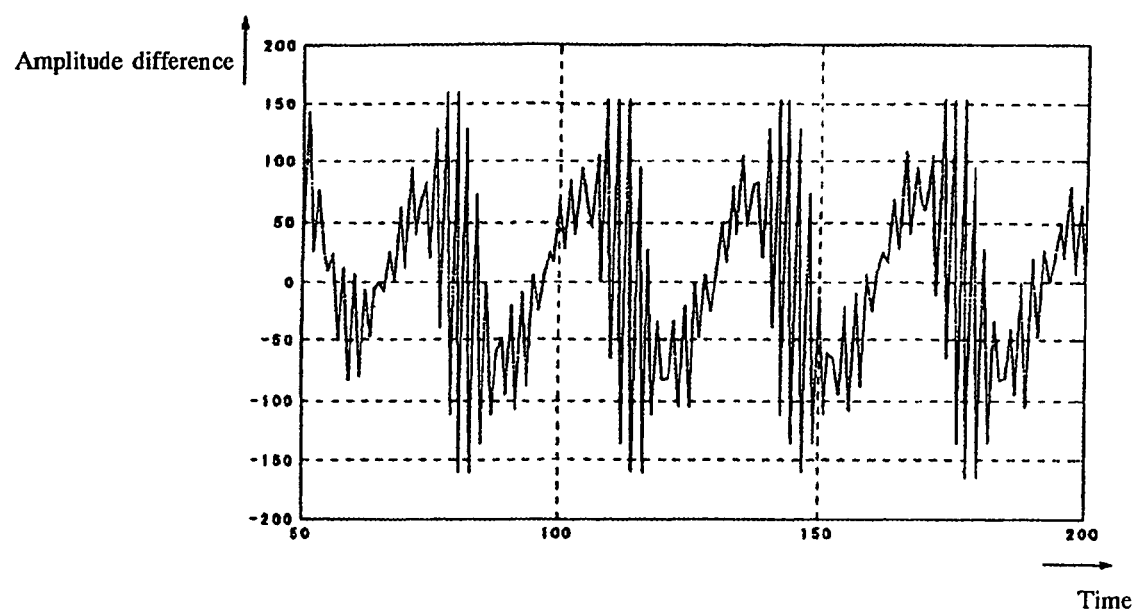
FIG. 6 is a diagram showing one example of the amplitude difference based on the squared value.

In addition, FIG. 6 shows the waveform of the difference signal that is output from the adder 13 (the value at point "c" shown in FIG. 4). In FIG. 6, the time is shown on the horizontal axis while the temporal change in the squared value (amplitude difference based on the squared value) is on the vertical axis.

The low pass filter 15 filters the difference signal that is input from the adder 13, thereby eliminating noise from the difference signal, and outputs this signal difference to the polarity bit converter Z.

Figure 7:
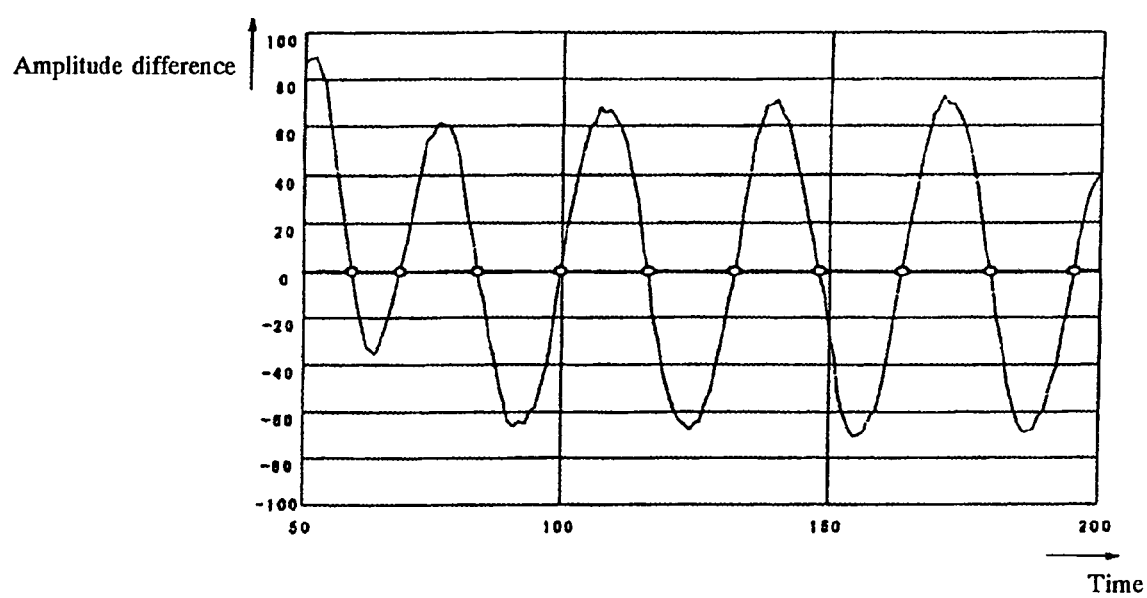
FIG. 7 is a diagram showing one example of the amplitude difference based on the squared value output from a low pass filter.

Here, FIG. 7 shows the waveform of the difference signal (after filtering) that is output from the low pass filter 15 (the value at point "d" shown in FIG. 4). In FIG. 7, the time is shown on the horizontal axis while the temporal change in the squared value (amplitude difference based on the squared value) is on the vertical axis.

As shown in FIG. 7 above, the waveform of the aforementioned difference signal becomes a waveform wherein positive values and negative values alternate (e.g., a sine wave shape), and the points where the values in this waveform (values on the vertical axis) cross zero (0) (points where values change from positive to negative or points where values change from negative to positive) appear at time intervals (intervals on the horizontal axis) which are equal to the period of the baud rate.

The polarity bit converter Z outputs data with a value of "1" to a register 16 and an XOR 17 which are provided in the change point extraction circuit T2 if the polarity of the value that is input from the low pass filter 15 is positive, but outputs data with a value of "0" to the register 16 and the XOR 17 if the polarity of the value that is input from the low pass filler 15 is negative.

The change point extraction circuit T2 consists of a register 16 and an XOR 17.

Based on the timing signal that is output from the timing generator 22 to be described later, for example, the register 16 shifts (e.g., delays) the value of the data which is input from the polarity bit converter Z by one clock cycle and outputs the result to the XOR 17.

In the case where the values of data which are input from the polarity bit converter Z and the register 16 are different, the XOR 17 provides output to a serial/parallel converter 18 which is provided in the change point measurement circuit T3 data with the value "1," or provides output to the serial/parallel converter 18 of data with the value "0" in the case where the values of data that are input from the polarity bit converter Z and the register 16 are the same (namely the positive or negative polarity of the data value is unchanged).

By means of such a constitution and operation, the change point extraction circuit T2 is able to extract the timing (positive/negative change points) at which the value of the waveform of the amplitude difference based on the squared value crosses the zero (0) point To wit, specifically, for the waveform of the amplitude difference based on the squared value, it is possible to compare the polarity (positive/negative) of data which is not shifted by 1 clock cycle against the polarity (positive/negative) of data which is shifted by 1 clock cycle, and thus detect the points of the timing at which these two polarities are different (points at which the polarity changes) as the positive/negative change points of the amplitude difference.

The change point measurement circuit T3 consists of a serial/parallel converter 18, an adder 19, and a register 20.

The serial/parallel converter 18 converts data that is input from the XOR 17 from serial data to parallel data, and outputs this data to the adder 19.

The adder 19 cumulatively adds the values of data that is input from the serial/parallel converter 18 a total of 16 times (16 clock cycles), and outputs the result of this addition to the register 20.

Based on a timing signal that is output from a timing generator 22 to be described later, for example, the register 20 shifts the result of the addition (a binary value) which is input from the adder 19 by 4 bits (in the direction of the smaller places) and outputs this shifted result of addition (average value) to a synchronizer 21 which is provided in the clock synchronization circuit T4. Note that when the 4-bit shift described here is performed, the result of the addition is divided by 16, and thus, the result of the addition of the 16 values is divided by 16 to give an average value.

By means of such a constitution and operation, the change point measurement circuit T3 counts and cumulatively adds 16 values of the timing of the positive/negative change points of the measured phase difference, and then performs a 4-bit shift of the binary value of the result of the addition and thus obtains an average value.

Note that the number of values of the change point timing (number of samplings) which are used when obtaining the average value of the positive/negative change point timing of the phase difference may be various, and as one example, it is preferable to use the average value of eight values of the change point timing near the center of the 20 symbols constituting the preamble pattern where it is (assumed to be) stable.

The clock synchronization circuit T4 is provided with a synchronizer 21.

Based on the timing signal that is input from the timing generator 22 to be described later, for example, and the average value (of the positive/negative change point timing of the amplitude difference) which is input from the register 20, the synchronizer 21 establishes the clock timing and outputs a base (synchronization) clock signal according to the synchronization timing thus established.

Note that, specifically, in the synchronizer 21, the clock is reset based on the timing signal that is input from the timing generator 22, and also, the clock is reset at each time interval corresponding to the average value (of the positive/negative change point timing of the amplitude difference) which is input from the register 20. Thus, the synchronization of the clock can be established. In this manner, by using average values from a plurality of samplings of the time intervals at which positive/negative change points in the amplitude difference are detected, it is possible to establish the clock synchronization.

The timing generation circuit T5 is provided with a timing generator 22.

Based on the timing signal that is input from the timing generator 22 to be described later, for example, the timing generator 22 generates a timing signal that determines the position when the clock is reset (position of the start of synchronization), and outputs this timing signal to the synchronizer 21 and the like.

As described above, in the synchronization establishment circuit of this Example, at the time that a (received) burst signal which is modulated by means of the :/4-shift QPSK modulation scheme is demodulated by means of the 7/4-shift QPSK demodulation scheme, the temporal amplitude difference (amplitude change) of the preamble pattern is detected, the detected amplitude difference is set as an offset level, the polarity of the amplitude difference as the offset level is detected, and a base clock signal is generated based on the time intervals at which the detected points of change of polarity occur.

In addition, at this time, in the synchronization establishment circuit of this Example, by taking advantage of the fact that the amplitude difference (amplitude change) of the preamble pattern periodically alternates between positive and negative, specifically, the polarity of this phase difference is detected and also the timing at which this polarity changes between positive and negative is detected, and by resetting the clock based on the result of calculating the average value of the time interval at which the this polarity changes between positive and negative, clock synchronization is established.

Moreover, in a demodulation circuit which is equipped with such a synchronization establishment circuit according to this Example, it is possible to accurately demodulate the unique word and the data contained in a received burst signal that is according to the base clock signal generated by the synchronization establishment circuit according to this Example.

Accordingly, in the synchronization establishment circuit of this Example, by establishing the clock synchronization based on the timing at which the amplitude difference of the preamble pattern periodically alternates between positive and negative, it is possible to establish synchronization in a short period of time. Thereby, it is possible to make the length (period) of the preamble pattern relatively short and increase the data transmission rate. In addition, even when a preamble pattern of a short length (period) is used, synchronization is established within the period of the preamble pattern, and as a result, it is possible for the received data in the first burst reception to be received correctly and reliably.

Note that in the synchronization establishment circuit of this Example, the carrier signal is not generated autonomously, for example, but rather the relative amplitudes of the preamble pattern contained in the (received) burst signal are used to establish synchronization. In this case, in the synchronization establishment circuit of this Example, the amplitude difference is processed as a periodic waveform, the positive or negative polarity of the value of this waveform is determined to detect the positive/negative change point timing of the amplitude difference, and the synchronization is established based on the results of this detection.

In a demodulation circuit which is equipped with the synchronization establishment circuit of this Example, at the time that demodulation is performed as described above, for example, it is also possible to establish synchronization from a plurality of (received) burst signals for each burst signal, and to demodulate each burst signal according to the synchronization timing thus established (for each burst signal).

In this case, with the synchronization establishment circuit of this Example, synchronization can be established in a short period of time, and as a result, even in the case in which a plurality of (received) burst signals containing preamble patterns as in this Example are received at nearly the same timing, it is possible to establish synchronization with each of the plurality of burst signals in a short period of time. Thus, it is possible to establish synchronization in a short period of time with the entire plurality of burst signals.

Here, in this Example, the preamble pattern in which "1001" repeats is equivalent to the "synchronization establishment signal wherein the change of the amplitude periodically alternates between positive and negative" which is referred to in the present invention, and the received burst signal containing this preamble pattern is equivalent to the "received signal containing a synchronization establishment signal" which is referred to in the present invention.

In addition, in this Example, the change point extraction circuit T5 shown in FIG. 4 above has the function of detecting the timing at which the change in amplitude of the preamble pattern that is contained in the received burst signal changes between positive and negative, and constitutes the "positive/negative change timing detection means" which is referred to in the present invention. Note that while the direction of change of the amplitude (in the positive direction or negative direction) was detected based on the squared waveform of the preamble pattern in this Example, it is also possible to detect whether the amplitude changes in the positive direction or the negative direction even if the squaring process is not performed, for example.

In addition, in this Example, the clock synchronization circuit T4 shown in FIG. 4 above has the function of establishing clock synchronization from the received burst signals based on the detected timing, and constitutes the "synchronization establishment means" which is referred to in the present invention.

Figure 8:
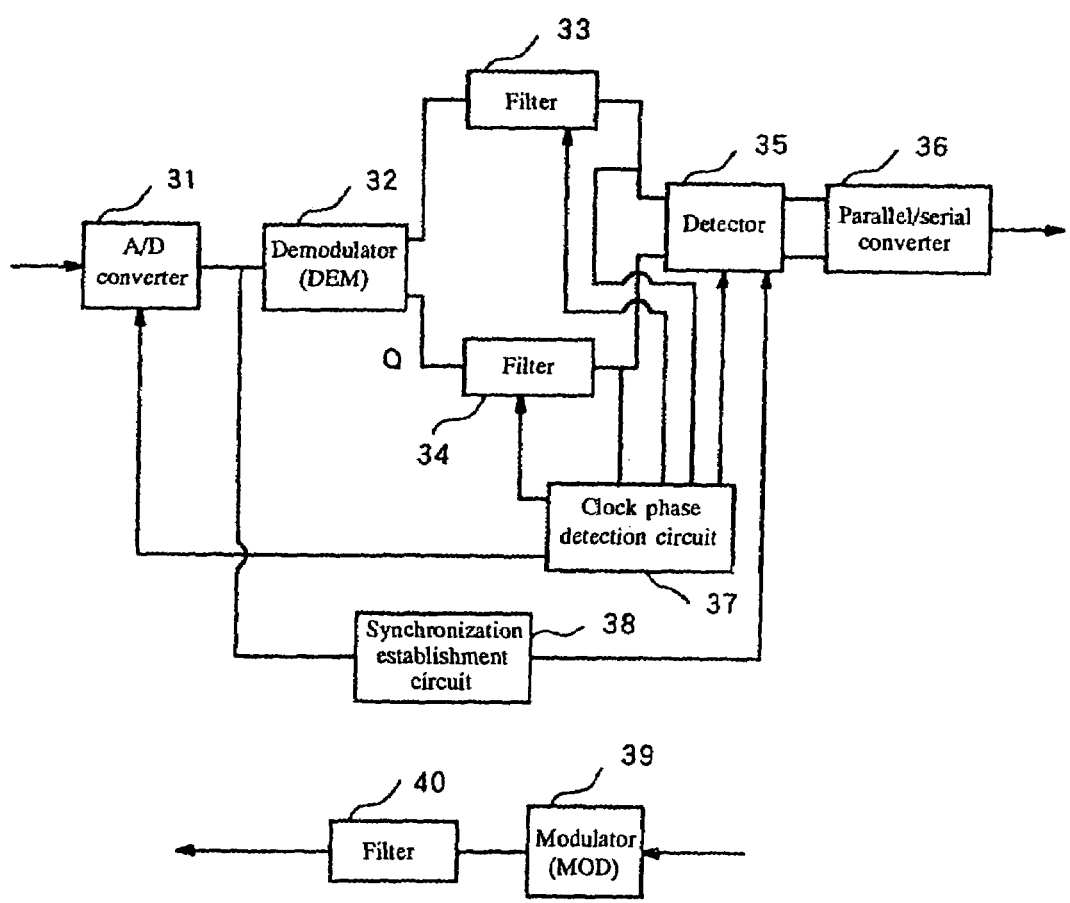
FIG. 8 is a schematic diagram of an example of the constitution of a transceiver modem according to Example 2 of the present invention.

Next, we shall describe a transceiver modem (modem) as Example 2 of the present invention with reference to FIG. 8. Note that the transceiver modem according to this Example is mounted within wireless communications equipment that performs wireless communications by using the $\pi/4$-shift QPSK modulation/demodulation scheme, and is provided between an antenna that transmits and receives wireless signals and the controller that controls the various signals thus transmitted and received, thereby connecting the antenna and the controller.

FIG. 8 is a schematic diagram of an example of the constitution of a transceiver modem according to this Example. This transceiver modem consists of an A/D converter 31, a demodulator 32, two filters 33 and 34, a detector 35, a parallel/serial converter 36, a clock phase detection circuit 37, and a synchronization establishment circuit 38 as the circuits on the receiving side. The transceiver modem also consists of a modulator 39 and a filter 40 as the circuits on the transmitting side.

We shall first describe the circuits on the receiving side.

The A/D converter 31) converts signals that are received via the antenna from analog signals to digital signals, and outputs the converted received signal to the demodulator 32 and the synchronization establishment circuit 38.

The synchronization establishment circuit 38 may be constituted with the same circuit constitution as that shown in FIG. 4 above, for example, and establishes clock synchronization based on received signals (e.g., the same preamble pattern as that illustrated in Example 1 above) that are input from the A/D converter 31, and outputs a base clock signal generated thereupon to a detector 35 to be described later.

The demodulator 32 demodulates the I component and the Q component of the received signal that is input from the A/D converter 31, and outputs this I component to one of the filters 3 and outputs this Q component to the other of the filters 34.

The one filter 33 takes the I component that is input from the demodulator 32, filters it and outputs the filtered I component to the detector 35.

The other filter 34 takes the Q component that is input from the demodulator 32, filters it and outputs the filtered Q component to the detector 35.

The detector 35 performs delayed detecting based on the base clock signal which is input from the synchronization establishment circuit 38. Specifically, the I and Q components that are input from the two filters 33 and 34 are detected (demodulated) and the demodulated data (2-bit) thus obtained is output to the parallel/serial converter 36.

The parallel/serial converter 3)6 converts demodulated data that is input from the detector 35 from parallel data to serial data and outputs the same to the controller.

Note that the clock phase detection circuit 37 detects the phase of the clock and supplies the results of the detection as output to the A/D converter 31, the two filters 33 and 34 and the detector 35.

Next, we shall describe the circuits on the transmitting side

The modulator 39 accepts input from the controller of a signal (data) to be transmitted, modulates this signal and outputs the same to the filter 40.

The filter 40 filters the modulated signal that is input from the modulator 39 and outputs the same to the antenna In this manner, with the transceiver modem according to this Example, the receiver inputs a signal which is received wirelessly via the antenna, and the modulator modulates this received signal and outputs the modulated signal to the controller. On the other hand, at the time that the modulator modulates the signal that is input from the controller and the transmitter wirelessly transmits this modulated signal via the antenna, the received signal is demodulated by a demodulation circuit which is equipped with a synchronization establishment circuit 3)8 such as that illustrated in Example 1 above, for example. Thus, with the transceiver modem according to this Example, it is possible to obtain effects such as being able to establish synchronization in a short period of time, in the same manner as that described in relation to the synchronization establishment circuit illustrated in Example 1 above, for example.

Here, the "modulation means" which is referred to in the present invention is constituted in this Example by the function of the modulator 39 modulating the transmitted signal (data subject to transmission).

In addition, the "positive/negative change timing detection means" and the "synchronization establishment means" which are referred to in the present invention are constituted in this Example by the functions of the synchronization establishment circuit 38 detecting the timing at which the positive/negative polarity of the change in amplitude changes in the preamble pattern that is contained in the received burst signal, and establishing clock synchronization from this received burst signal based on the detected timing.

In addition, the "demodulation means" which is referred to in the present invention is constituted in this Example by the function of the detector 35 demodulating the (unique word and data contained in the) received burst signal according to the synchronization timing which is established by the synchronization establishment circuit 38.

Next, we shall describe a base station which is used in the Advanced Cruise-Assist Highway System (AHS) as Example 3 of the present invention, with reference to the drawings. Note that the Advanced Cruise-Assist Highway System in this Example is one example of the "traffic information system" which is referred to in the present invention.

Figure 9:
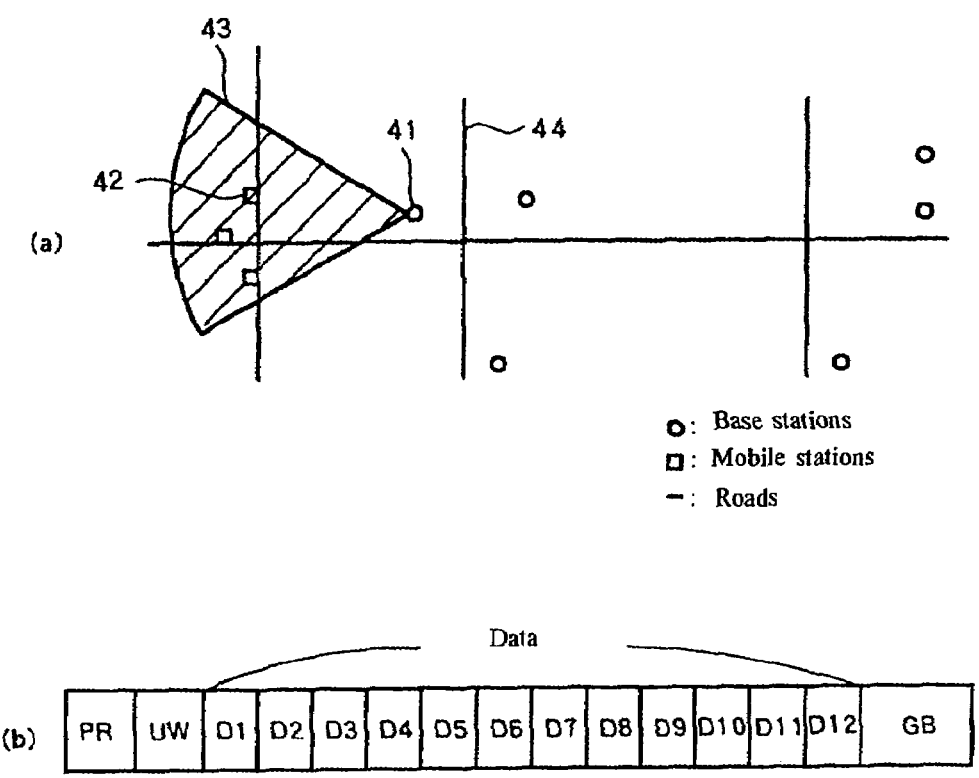
FIG. 9 is a schematic diagram of an example of the constitution of the Advanced Cruise-Assist Highway System according to Example 3 of the present invention, along with an example of the constitution of burst signals.

FIG. 9(a) is a schematic diagram of an example of the constitution of the Advanced Cruise-Assist Highway System according to this Example. This system consists of a plurality of base stations 41 installed (in a fixed manner, for example) in the vicinity of roads 44, and a plurality of mobile stations 42 (wireless equipment installed in automobiles or other mobile equipment, for example) that move along the roads 44. Note that FIG. 9(a) includes symbols ("44," "41," "42") for only a portion of the roads, one base station and one mobile station, and the symbols are omitted for the others. In addition, the cell 43 of the base station 41 which is given a symbol is illustrated as an example.

In the Advanced Cruise-Assist Highway System illustrated in FIG. 9(a), one base station 41 uses the π/4-shift QPSK modulation/demodulation scheme, for example, to wirelessly communicate traffic-related information or the like to a plurality (a maximum of 12 in this Example) of mobile stations 42 present within the cell of this base station 41.

In addition, in the Advanced Cruise-Assist Highway System of this Example, when wireless communications are performed by using a burst signal containing a preamble pattern like that illustrated in Example 1 above, for example, the frame format of the burst signal used in communications from the base station 41 of this Example to the mobile stations 42 may have, as shown in FIG. 9(b) for example, twelve slots D1 through D12 in the data portion, and thus, it is possible for one base station 41 to communicate wirelessly with a maximum of twelve mobile stations 42 (simultaneously).

Figure 10:
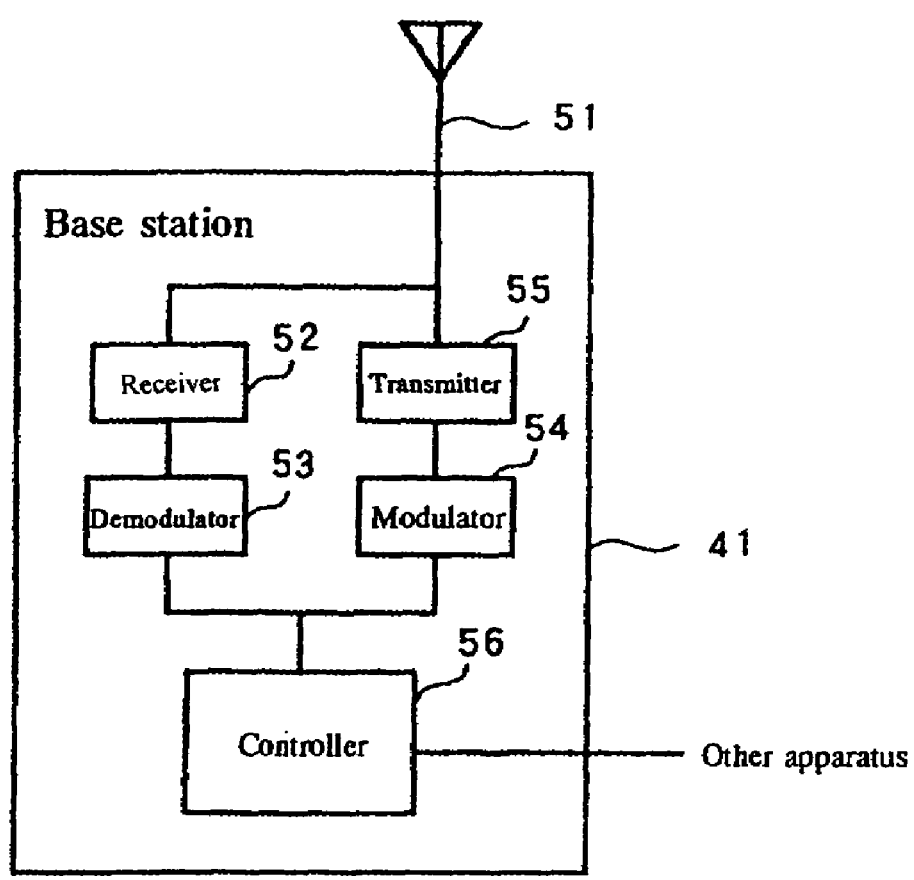
FIG. 10 is a diagram showing an example of the constitution of a base station which is provided for the Advanced Cruise-Assist Highway System.

FIG. 10 is a diagram showing an example of the constitution of the aforementioned base station. This base station 41 consists of an antenna 51, a receiver 52, a demodulator 53, a modulator 54, a transmitter 55, and a controller 56.

The antenna 51 receives wireless signals.

Via the antenna 51, the receiver 52 receives signals that are transmitted wirelessly from the mobile stations 42, and provides an output of these received signals to the demodulator 53.

The demodulator 53 has a synchronization establishment circuit like that illustrated in FIG. 4 above and also has a circuit for demodulating the received signals. The demodulator 53 establishes clock synchronization based on the received signals (e.g., a preamble pattern like that illustrated in Example 1 above) which are input from the receiver 52, modulates the received signals based on the synchronization clock thus established, and provides an output of the results of this demodulation to the controller 56.

The modulator 54 accepts an input from the controller 56 of signals (data) to be transmitted, modulates these signals and outputs the same to the transmitter 55.

The transmitter 55 uses the antenna 51 to wirelessly transmit modulated signals which are input from the modulator 54 to the mobile stations 42.

The controller 56 may be connected to another apparatus (e.g., other base stations or a main control facility) by wire, for example, and may transmit signals (demodulated data) which are input from the demodulator 53 to this other apparatus, or the controller 56 may receive signals (data) which are transmitted from this other apparatus and output the same to the modulator 54, thereby performing the exchange of sent/received signals with this other facility.

As described above, with the base station 41 of this Example, when the receiver 52 accepts an input of signals that are wirelessly received via the antenna 51, modulates these received signals and outputs them to the controller 56, or when the modulator 54 modulates signals which are input from the controller 56 and the transmitter 55 wirelessly transmits these modulated signals from the antenna 51, a demodulator 53 which is provided with a synchronization establishment circuit like that illustrated in Example 1 above is used to demodulate the received signals. For this reason, with the base station 41 of this Example, in the same manner as described with regard to the synchronization establishment circuit illustrated in Example 1 above, synchronization can be established in a short period of time and other meritorious effects can be obtained.

As one example, with the base station 41 of this Example, even in the case in which a plurality of mobile stations 42 enter its cell 43 at a high speed and synchronization must be established quickly with each of the mobile stations 42, it is possible to establish this synchronization in a short period of time as described in Example 1 above, and as a result, communication with each of the mobile stations 42 is possible.

Note that in the prior-art synchronization detection scheme, while transmitting and receiving between one base station and one mobile station (namely one-to-one transmitting and receiving) is possible, in the case in which a plurality of mobile stations enter the cell at a high speed as described above, a problem arose wherein the mobile stations would leave the cell before the base station had established synchronization. In addition, with PHS, for example, because of the synchronization detection scheme that is adopted therein (a scheme wherein synchronization is established gradually while performing feedback of the signal subject to synchronization), communication between one base station and a plurality of mobile stations is performed, but with PHS, in order to establish communication between a base station and a high-speed mobile station, simultaneous transmission and reception with a different base station is utilized. To wit, with PHS, a single base station cannot establish synchronization quickly. The base station 41 of this Example can solve this problem with the prior art.

Here, in the base station 41 of this Example, the antenna 51 that transmits and receives wireless signals is equivalent to the "antenna" which is referred to in the present invention.

In addition, in the base station 41 of this Example, the signal modulating function of the modulator 54 constitutes the "modulation means" which is referred to in the present invention.

In addition, in the base station 41 of this Example, the function whereby the transmitter 55 wirelessly transmits modulated signals to the mobile stations 42 via the antenna 51 constitutes the "transmission means" which is referred to in the present invention.

In addition, in the base station 41 of this Example, the function whereby the receiver 52 receives wirelessly transmitted signals from the mobile stations 42 via the antenna 51 constitutes the "receiving means" which is referred to in the present invention.

In addition, in the base station 41 of this Example, the function whereby the demodulator 53 detects the timing of the positive/negative polarity change in the change in amplitude of the preamble pattern that is contained in the received burst signal and establishes clock synchronization from the received burst signal based on the detected timing, and the function whereby the (unique word and data contained in the) received burst signal is demodulated according to the established synchronization timing constitute the "positive/negative change timing detection means," the "synchronization establishment means" and the "demodulation means" which are referred to in the present invention.

In addition, in the base station 41 of this Example, the function whereby the controller 56 communicates the signals that are exchanged with the mobile stations 42 to the external apparatus constitutes the "control means" which is referred to in the present invention.

Here, the embodiment of the demodulation method according to the present invention, and the constitution of the synchronization establishment apparatus, modem or traffic information system according to the present invention are in no way limited to those illustrated above, but rather various embodiments or constitutions may be used In addition, the applicable fields of the present invention are in no way limited to those illustrated above, but rather the present invention is applicable to various fields.

In addition, the described above is the demodulation method and apparatus of the side that establishes synchronization based on a synchronization establishment signal (the receiving side), but the modulation method and apparatus of the side that transmits such a synchronization establishment signal is to have a constitution whereby it generates a signal that contains a synchronization establishment signal (e.g., a preamble pattern such as that illustrated in Example 1 above) wherein the change in amplitude periodically alternates between positive and negative (e.g., a burst signal modulated by the $\pi/4$-shift QPSK modulation scheme) and transmits the same to the receiving side.

In addition, the synchronization establishment processing and various types of processing which are performed by the method and apparatus according to the present invention may be constituted by being implemented in hardware resources which are equipped with a processor and memory and the like, for example, being controlled by means of a processor executing a control program stored in ROM. In addition, the various functional means for executing this processing may also be constituted as independent hardware circuits.

In addition, the present invention may also be understood as one wherein the above-described control program is stored in a floppy disk, CD-ROM or other computer-readable recording media, so that the processing according to the present invention can be implemented by loading the control program from the recording medium into a computer and executing the program by a processor.

As described above, with the demodulation method, synchronization establishment apparatus, modem and base station according to the present invention, synchronization is established from a received signal based on the timing of a change in the positive/negative polarity of the change in amplitude of a synchronization establishment signal that is contained in a received signal which contains a synchronization establishment signal wherein the change in amplitude periodically alternates between positive and negative, and therefore, synchronization can be established in a short period of time and other meritorious effects can be obtained.

What is claimed is:

1. A synchronization establishment apparatus operable to establish synchronization from a received signal that contains a synchronization establishment signal whose change in amplitude periodically alternates between positive and negative, said synchronization establishment apparatus comprising:

positive/negative change timing detection means for detecting a timing of changes in the positive/negative polarity of the change in amplitude of the synchronization establishment signal contained in the received signal; and synchronization establishment means for establishing synchronization from the received signal based on the timing detected by said positive/negative change timing detection means;

wherein a preamble pattern in which 1001 is repeated in $\pi/4$-shift QPSK is used as the synchronization establishment signal, and a burst signal containing the preamble pattern is used as the received signal;

wherein said synchronization establishment apparatus further comprises:
  an amplitude difference detection circuit operable to use an A/D converter to convert the received burst signal from an analog signal to a digital signal, to square the value of the converted digital signal, to detect a temporal change of the squared value by obtaining a difference between the squared value and a delayed version of the squared value, and to output the temporal change of the squared value as a difference signal;
  a low pass filter operable to filter the difference signal outputted from said amplitude difference detection circuit, and to output a filtered signal; and
  a polarity bit converter operable to output data of first or second value depending on whether the polarity value of the filtered signal outputted from said low pass filter is positive or the polarity value of the filtered signal outputted from said low pass filter is negative;
wherein said positive/negative change timing detection means comprises a change point extraction circuit operable to, based on the first or second value outputted from said polarity bit converter, extract the timing at which the value of the waveform of the amplitude difference based on the squared value crosses a zero point;
wherein said synchronization establishment apparatus further comprises a change point measurement circuit operable to average the positive/negative change point timing of the extracted amplitude difference based on the squared value;
wherein said synchronization establishment means comprises a clock synchronization establishment circuit operable to, based on the value of the positive/negative change point timing averaged by said change point measurement circuit, establish clock synchronization; and
wherein said synchronization establishment apparatus further comprises a timing generation circuit operable to, based on the timing at which the received burst signal starts, determine a position to reset a clock as a starting position for establishing synchronization for the received signal, and outputting a timing signal indicating the starting position to said amplitude difference detection circuit.

* * * * *